United States Patent
Cui et al.

(10) Patent No.: US 9,462,571 B2
(45) Date of Patent: Oct. 4, 2016

(54) ADAPTIVE AND SELECTIVE BUNDLING OF DOWNLINK PAGING MESSAGES

(71) Applicants: AT&T INTELLECTUAL PROPERTY I, L.P., Atlanta, GA (US); AT&T Mobility II LLC, Atlanta, GA (US)

(72) Inventors: Zhi Cui, Sugar Hill, GA (US); Arthur Richard Brisebois, Cumming, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/520,004

(22) Filed: Oct. 21, 2014

(65) Prior Publication Data

US 2016/0112985 A1  Apr. 21, 2016

(51) Int. Cl.
| | |
|---|---|
| *H04W 74/00* | (2009.01) |
| *H04W 68/02* | (2009.01) |
| *H04W 8/02* | (2009.01) |
| *H04W 28/02* | (2009.01) |
| *H04W 72/04* | (2009.01) |
| *H04W 88/00* | (2009.01) |

(52) U.S. Cl.
CPC ............ *H04W 68/02* (2013.01); *H04W 8/02* (2013.01); *H04W 28/0226* (2013.01); *H04W 72/048* (2013.01); *H04W 88/005* (2013.01)

(58) Field of Classification Search
CPC . H04W 68/02; H04W 8/02; H04W 28/0226; H04W 72/048; H04W 88/005
USPC ....................................................... 455/458
See application file for complete search history.

(56) References Cited

U.S. PATENT DOCUMENTS

| | | | | |
|---|---|---|---|---|
| 5,943,327 | A | * | 8/1999 | Mademann ......... H04W 72/044 370/329 |
| 6,115,547 | A | * | 9/2000 | Ghatate ................. G06F 15/177 703/13 |
| 8,108,757 | B2 | | 1/2012 | Ahn |

(Continued)

FOREIGN PATENT DOCUMENTS

| | | |
|---|---|---|
| AU | 2009282091 B2 | 2/2014 |
| EP | 2320692 | 6/2013 |

(Continued)

OTHER PUBLICATIONS

Xu, "Identifying diverse usage behaviors of smartphone apps," Proceedings of the 2011 ACM SIGCOMM conference on Internet measurement conference, ACM, 2011.*

(Continued)

*Primary Examiner* — Juan A Torres
(74) *Attorney, Agent, or Firm* — Hartman & Citrin LLC (57) ABSTRACT

Concepts and technologies are described herein for adaptive and selective bundling of downlink paging messages. According to one aspect disclosed herein, a mobility management entity ("MME") can determine whether to delay a paging procedure to deliver a downlink paging message to a mobile device served by the MME. If the MME determines that the paging procedure to deliver the downlink paging message to the mobile device should be delayed, then the MME can store the downlink paging message in a bundling cache. If the MME determines that the paging procedure to deliver the downlink paging message to the mobile device should not be delayed, then the MME can initiate the paging procedure.

17 Claims, 5 Drawing Sheets

(56) References Cited

U.S. PATENT DOCUMENTS

| | | |
|---|---|---|
| 8,345,605 B2 | 1/2013 | Shen et al. |
| 8,457,044 B2 | 6/2013 | Song |
| 8,537,674 B2 | 9/2013 | Brisebois et al. |
| 8,553,591 B2 | 10/2013 | Jiang et al. |
| 8,576,719 B2 | 11/2013 | Dinan et al. |
| 8,578,035 B2 | 11/2013 | Miklos |
| 8,578,046 B2 | 11/2013 | Crockett et al. |
| 8,588,253 B2 | 11/2013 | Dyck |
| 8,724,504 B2 | 5/2014 | Gao et al. |
| 2009/0175214 A1 | 7/2009 | Sfar |
| 2009/0268635 A1 | 10/2009 | Gallagher |
| 2010/0284356 A1 | 11/2010 | Ray et al. |
| 2011/0128922 A1 | 6/2011 | Chen et al. |
| 2012/0106456 A1 | 5/2012 | Jin |
| 2012/0120799 A1 | 5/2012 | Brisebois et al. |
| 2012/0176998 A1 | 7/2012 | Muellner et al. |
| 2012/0213192 A1 | 8/2012 | Kiyoshima |
| 2012/0224536 A1 | 9/2012 | Hahn |
| 2012/0281566 A1 | 11/2012 | Pelletier |
| 2012/0287869 A1 | 11/2012 | Xi |
| 2013/0077541 A1 | 3/2013 | Lin et al. |
| 2013/0114401 A1 | 5/2013 | Martin et al. |
| 2013/0121349 A1 | 5/2013 | Crockett et al. |
| 2013/0182624 A1 | 7/2013 | Sun et al. |
| 2013/0322238 A1 | 12/2013 | Sirotkin |
| 2013/0329551 A1 | 12/2013 | Brisebois et al. |
| 2013/0336223 A1 | 12/2013 | Huang et al. |
| 2013/0343357 A1 | 12/2013 | Lindoff et al. |
| 2014/0032730 A1 | 1/2014 | Fall et al. |
| 2014/0044027 A1 | 2/2014 | Beale |
| 2014/0126441 A1 | 5/2014 | Rai et al. |
| 2014/0126551 A1 | 5/2014 | Nammi |
| 2014/0146763 A1 | 5/2014 | Khay-Ibbat et al. |
| 2014/0219248 A1* | 8/2014 | Reddiboyana ...... H04W 76/025 370/331 |
| 2015/0230276 A1* | 8/2015 | Jung ............... H04W 72/06 370/229 |

FOREIGN PATENT DOCUMENTS

| | | | |
|---|---|---|---|
| GB | 2477785 | 8/2011 | |
| JP | 2009253981 | 10/2009 | |
| JP | 2014014123 | 1/2014 | |
| WO | WO 2012127591 | 9/2012 | |
| WO | WO2013009892 A1 | 1/2013 | |
| WO | WO 2014166030 A1 * | 10/2014 | ........ H04W 52/0216 |

OTHER PUBLICATIONS

Raymond et al., "PGN3—Store and Forward Approach to Dynamic Networks," retrieved at http://cs.gmu.edu/~yhwang1/INFS612/Sample_Projects/2009_Fall_PGN_3_final_report.pdf on Oct. 21, 2014.

Rivas et al., "Obtaining More Realistic Cross-Layer QoS Measurements: A VoIP over LTE Use Case," Journal of Computer Networks and Communications, vol. 2013, Hindawi.

Beard et al., "QoS and Channel Aware Packet Bundling for VoIP and Data Traffic in Multi-Carrier Cellular Networks," IEEE $22^{nd}$ International Teletraffic Congress, 2010, IEEE.

Lee et al., "PhonePool: On Energy-efficient Mobile Network Collaboration with Provider Aggregation," 2014.

Banawan, "Comparative study between Mobile WiMAX (IEEE802.16e based) and 3GPP LTE," 2010.

Sadiwala, "Convergence Towards Next Generation Wireless Networks," IOSR Journal of Electrical and Electronics Engineering 4.4 (2013): 1-13.

Srivatava, "Tutorial on Functionality and Performance," Diss. University of Texas at Arlington, 2010.

Ungureanu, "Flexible and Programmable Evolved Packet Core: A New SDN-based Model," Diss. TU Delft, Delft University of Technology, 2014.

U.S. Appl. No. 14/520,036, filed Oct. 21, 2014.

U.S. Office Action dated Jul. 12, 2016 in U.S. Appl. No. 14/520,036.

* cited by examiner

ADAPTIVE AND SELECTIVE BUNDLING OF DOWNLINK PAGING MESSAGES

BACKGROUND

In recent years, mobile telecommunications carriers have experienced a dramatic increase in traffic on their networks, and this trend will likely continue. This increase in traffic has been caused in part by the increased adoption of smartphones and other devices that rely on mobile telecommunications networks, and the migration of many customers from utilizing landline telecommunication services to utilizing mobile telecommunication services for their communications needs. To meet the demands of higher traffic and to improve the end user experience, mobile telecommunications carriers are examining mechanisms by which to improve network efficiency, network capacity, and the end user experience, while keeping operational costs at a level conducive to maintaining competitive rates for the services they provide.

SUMMARY

Concepts and technologies are described herein for adaptive and selective bundling of downlink paging messages. According to one aspect disclosed herein, a mobility management entity ("MME") can determine whether to delay a paging procedure to deliver a downlink paging message to a mobile device served by the MME. If the MME determines that the paging procedure to deliver the downlink paging message to the mobile device should be delayed, then the MME can store the downlink paging message in a bundling cache. If the MME determines that the paging procedure to deliver the downlink paging message to the mobile device should not be delayed, then the MME can initiate the paging procedure.

In some embodiments, the MME can determine whether a data flow associated with the mobile device is delay sensitive. If the MME determines that the data flow associated with the mobile device is delay sensitive, then the MME can determine that the paging procedure to deliver the downlink paging message to the mobile device should not be delayed, and in response, the MME can initiate the paging procedure without delay and without storing the downlink paging message in the bundling cache. If the MME determines that the data flow associated with the mobile device is not delay sensitive, then the MME can determine that the paging procedure to deliver the downlink paging message to the mobile device should be delayed.

In some embodiments, the MME can determine a quality of service ("QoS") category for the data flow associated with the mobile device. The MME can determine whether the data flow associated with the mobile device is delay sensitive based upon the QoS category.

In some embodiments, the MME can initiate a bundle timer for the bundling cache. The MME can determine whether the bundle timer has expired. If the MME determines that the bundle timer has expired, then the MME can determine that the paging procedure to deliver the downlink paging message to the mobile device should not be further delayed and, in response, the MME can initiate the paging procedure to deliver the downlink paging message stored in the bundling cache to the mobile device. If the MME determines that the bundle timer has not expired, then the MME can determine that the paging procedure to deliver the downlink paging message to the mobile device should be further delayed and, in response, the MME can allow storage of a further downlink paging message in the bundling cache.

In some embodiments, the MME can calculate a signaling load experienced by a cell that is serving the mobile device. The MME can determine whether the cell that is serving the mobile device is congested based upon the signaling load. If the MME determines that the cell that is serving the mobile device is not congested, then the MME can determine that the paging procedure to deliver the downlink paging message to the mobile device should not be delayed and, in response, the MME can initiate the paging procedure without delay and without storing the downlink paging message in the bundling cache. If the MME determines that the cell that is serving the mobile device is congested, then the MME can determine that the paging procedure to deliver the downlink paging message to the mobile device should be delayed.

In some embodiments, the MME can receive a current device bundling state from the mobile device. The MME can determine whether the current device bundling state is set to conserve resources. If the MME determines that the current device bundling state is not set to conserve resources, then the MME can determine that the paging procedure to deliver the downlink paging message to the mobile device should not be delayed and, in response, the MME can initiate the paging procedure without delay and without storing the downlink paging message in the bundling cache. If the MME determines that the current device bundling state is set to conserve resources, then the MME can determine that the paging procedure to deliver the downlink paging message to the mobile device should be delayed.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Wireless data traffic has been growing at a very fast pace and the trend is still continuing. Beyond data traffic volume growth, there has been an even more aggressive growth in data signaling load. Among all the signaling messages/procedures on cellular networks, radio access network ("RAN") signaling procedures have caused the most growth and impact. This is due to complicated radio resource sharing techniques required to conserve resources occupied by various users and services.

The majority of RAN signaling events are for connection setup and state transitions (also known as "channel switching"). Paging information is utilized for network-initiated connection setup. In Long-Term Evolution ("LTE") networks, when a mobile device (also known as user equipment ("UE"), or "handset") is in radio resource control ("RRC") idle mode ("RRC_IDLE"), and whenever data is to be sent downlink to the mobile device, a packet data network ("PDN") gateway ("PGW") sends the data to a serving gateway ("SGW"). The SGW generates a downlink notification message and sends the downlink notification message to a mobility management entity ("MME"). The MME triggers a paging procedure.

When a mobile device is in the idle mode state, the MME knows the location of the mobile device on a per tracking area ("TA") basis, instead of at the cell level. For this reason, the MME pages all base stations within a TA and informs (e.g., via an S1AP paging message in LTE) the base stations to broadcast paging messages to the impacted tracking area(s). The base station receives the S1AP paging message from the MME and constructs an RRC paging message.

The mobile device wakes up on every paging occasion. The paging occasion is a function of the discontinuous reception ("DRX") cycle. The mobile device searches the paging radio network temporary identifier ("P-RNTI") within the physical downlink control channel ("PDCCH"). If the mobile device detects a group identity used for the P-RNTI, when the mobile device wakes up, and finds the mobile device's identity, the mobile device proceeds to decode the RRC paging message and triggers the random access procedure ("RAC") followed by establishing the RRC connection. If the mobile device does not find the mobile device's identity in the paging message, the mobile device goes back to sleep based upon the DRX cycle.

Concepts and technologies are described herein for dynamic bundling of downlink packet flow paging messages. The concepts and technologies disclosed herein reduce the amount of paging and therefore reduce the radio access network ("RAN") signaling events via bundling downlink packet flow paging messages based upon a last known bundling state of mobile devices.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of traffic steering across radio access technologies and radio frequencies utilizing cell broadcast messages will be presented.

Figure 1:
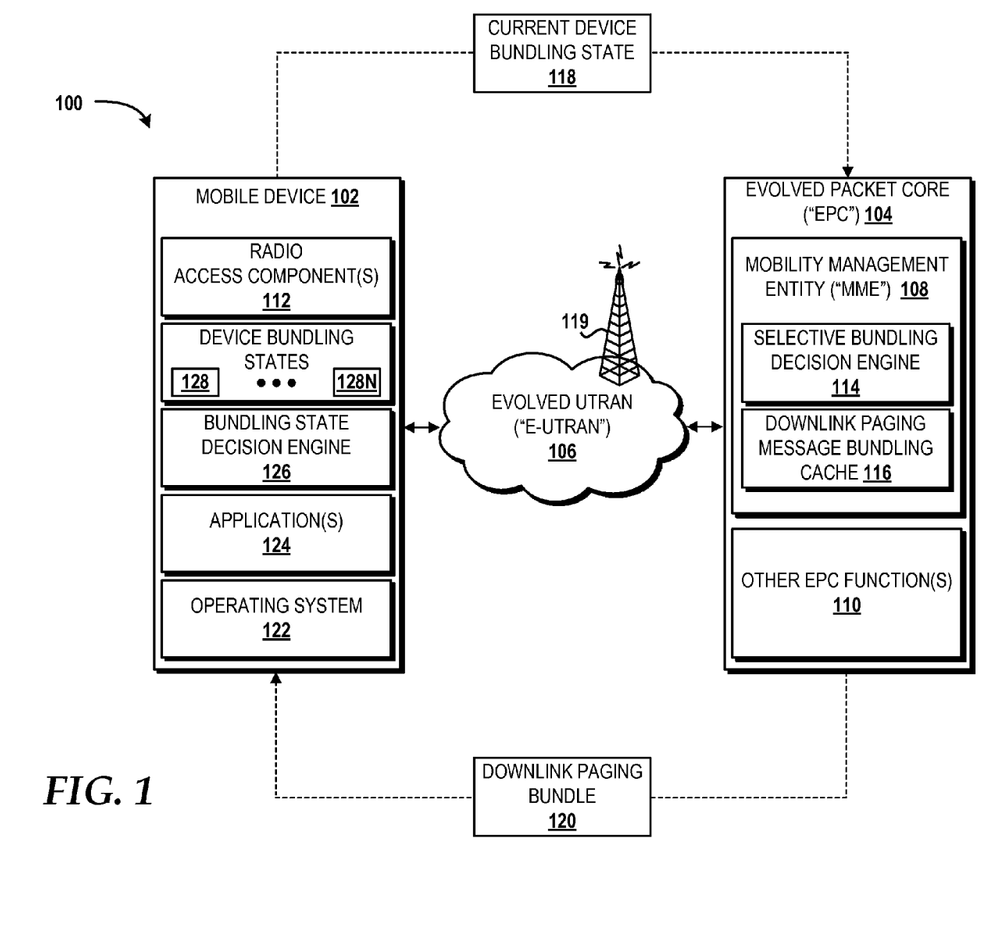
FIG. 1 is a block diagram illustrating aspects of an illustrative operating environment for various concepts disclosed herein.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The illustrated operating environment 100 includes a mobile device 102 that is in communication with an evolved packet core ("EPC") 104 via an evolved Universal Mobile Telecommunications System Terrestrial Radio Access Network ("E-UTRAN") 106. In the illustrated embodiment, the EPC 104 includes a mobility management entity ("MME") 108 and one or more other EPC functions 110.

The mobile device 102 may be a cellular telephone, a feature phone, a smartphone, a mobile computing device, a portable television, a portable video game console, other computing device, or any other user equipment ("UE") that is configured to communicate with one or more one or more RANs, such as the E-UTRAN 106, via one or more radio access components 112. As such, the radio access component(s) 112 can include at least one transceiver that is compatible with Long-Term Evolution ("LTE") to enable communications with the E-UTRAN 106. The radio access component(s) 112 can include one or more other transceivers to enable communications with other access networks including, but not limited to, access networks that operate in accordance with Global System for Mobile communications ("GSM"), Code Division Multiple Access ("CDMA") ONE, CDMA2000, and various other Third Generation Partnership Project ("3GPP"). Moreover, the other transceiver(s) may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like. The radio access component(s) 112 also can include one or more transceivers to enable communications with WI-MAX and/or WI-FI networks.

The MME 108 performs signal handling operations related to mobility and security for access to the E-UTRAN 106. The MME 108 can track and page the mobile device 102 when the mobile device 102 is in idle mode. The illustrated MME 108 includes a selective bundling decision engine 114 and a downlink paging message bundling cache 116. Alternatively, the MME 108 can be in communication with one or more computing systems and/or devices that can execute, via one or more processors, the selective bundling decision engine 114 and/or provide one or more computer-readable storage mediums for the downlink paging message bundling cache 116.

The selective bundling decision engine 114 can be executed by one or more processors of the MME 108 to determine whether two or more downlink paging messages should be bundled in the downlink paging message bundling cache 116. The selective bundling decision engine 114 can bundle two or more downlink paging messages.

In some embodiments, the selective bundling decision engine 114 can receive a current device bundling state 118 from the mobile device 102 and/or one or more other mobile devices (not shown) located in the same cell (e.g., a cell served by an eNodeB 119). The selective bundling decision engine 114 can determine whether downlink paging messages directed to the mobile device 102 and/or other mobile devices (not shown) operating within a TA served by the MME 108 should be bundled. The current device bundling state 118 can identify the mobile device 102 being in a state in which communications should be performed in real-time for best latency to facilitate operations being performed by the mobile device 102. The current device bundling state 118 can identify the mobile device 102 being in a state in which communications should be bundled to conserve resources. The current device bundling state 118, in some embodiments, is included in an SLAP initial paging message generated by the mobile device 102 and sent to the MME 108.

If the current device bundling state is "bundle to conserve UE resources", then the MME 108 can bundle pages for the mobile device 102 no matter the signaling load at the eNodeB 119. In this manner, the MME 108 can correlate with the UE DRX cycle for battery conservation. Each eNodeB 119 within a TA can report PDCCH, PUCCH and paging channel occupancy back to the MME 108 according to a set interval. If the MME 108 detects that a significant distribution of eNodeBs 119, within the same TA, have high paging channel occupancy, then network resource conservation is desired, and thus driving even longer bundling timers for the mobile device 102 in the bundle to conserve UE resources state.

Signaling load also can be detected within the MME 108. For example, any processor cycles the MME 108 has available for paging can be indicative of the signaling load. In this case, the load at the MME 108 (in addition to the load at the eNodeB 119) can be used to determine network signaling load (not just RAN signaling load). Moreover, the combination of UE bundling state and network signaling load can be used to determine the length of bundling timers on a per-UE basis. If the UE bundling state for the mobile device 102 is "bundle to conserve UE resources" and the network load is high (e.g., based upon a threshold defined for "high"), then the longest bundling timers can be used for the mobile device 102, and thus conserving network and UE resources. If the MME 108 is the network signaling load bottleneck (e.g., low MME processor cycles available for paging), then the MME 108 can choose to bundle pages in order to flatten the aggregate peak paging load over time. In this case, the UE bundling state can be used to determine which UE to bundle to conserve MME processor resources.

The selective bundling decision engine 114, in some embodiments, can collect data from the EPC 104, such as from one or more of the other EPC functions 110, and can calculate, utilizing the data, a signaling load of the E-UTRAN 106. An illustrative method in which the selective bundling decision engine 114 collects data from the EPC 104 and utilizes the data to calculate the signaling load of the E-UTRAN 106 is described below with reference to FIG. 2.

The selective bundling decision engine 114 can selectively bundle downlink paging messages if the last known device bundling state, such as the current device bundling state 118 last received by the MME 108, is to bundle to conserve resources and the quality of service ("QoS") category on an associated data flow indicates that the data flow is not delay sensitive according to QoS class identifier ("QCI") class attributes. While the mobile device 102 is in the bundle to conserve resources state, as identified in the last known device bundling state, the selective bundling decision engine 114 can cache messages associated with certain QCIs for a defined bundling interval. Upon expiration of the bundling timer, the MME 108 can initiate a paging procedure and can send a downlink paging bundle 120 that includes at least a portion of the messages stored in the downlink paging message bundling cache 116. While the mobile device 102 is in the real-time for best latency state, the MME 108 can initiate the paging procedure without delay and bundling.

The other EPC functions 110 of the EPC 104 can include a serving gateway ("SGW"), a packet data network ("PDN") gateway ("PGW"), and a home subscriber server ("HSS"). The SGW can transport Internet Protocol ("IP") data traffic between the mobile device 102 and one or more external networks, including, for example, an IP multimedia subsystem ("IMS") network. The SGW connects the E-UTRAN 106 to the EPC 104 to allow IP data communications between the mobile device 102 and the EPC 104. The SGW also performs operations to facilitate handover among eNodeBs, such as the eNodeB 119, within the E-UTRAN 106 and between other LTE and 3GPP access networks. The SGW is in communication with the PDN gateway.

The PDN gateway interconnects the EPC 104 and external IP networks (i.e., PDNs—not shown). The PDN gateway routes IP packets to and from the PDNs. The PDN gateway also performs operations such as IP address/IP prefix allocation, policy control, and charging. In some implementations, the PDN gateway and the SGW are combined.

The HSS is a database that contains user/subscriber information. The HSS also performs operations to support mobility management, call and session setup, user authentication, and access authorization.

The illustrated mobile device 102 also includes an operating system 122, one or more applications 124, a bundling state decision engine 126, and/or device bundling states 128-128N. The operating system 122 is a program for controlling the operation of the mobile device 102. The operating system 122 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The application(s) 124 can execute on top of the operating system 122. The application(s) 124 can include, for example, one or more presence applications, one or more visual voice mail applications, one or more messaging applications, one or more text-to-speech and/or speech-to-text applications, one or more add-ons, one or more plug-ins, one or more email applications, one or more music applications, one or more video applications, one or more camera applications, one or more location-based service applications, one or more power conservation applications, one or more game applications, one or more productivity applications, one or more entertainment applications, one or more enterprise applications, combinations thereof, and the like.

The bundling state decision engine 126 can monitor operations performed, at least in part, by the application(s) 124 to determine characteristics of data sessions created by or otherwise utilized by the application(s) 124. In other words, the bundling state decision engine 126 can determine whether the application(s) 124 exhibit interactive or non-interactive characteristics. The bundling state decision engine 126 can monitor user input to and data flow requests by the application(s) 124. The bundling state decision engine 126 can categorize a data flow request according to a level of interactivity considering the user input(s) that preceded the data flow request. For example, if an uplink data flow request closely follows user input (e.g., <100 milliseconds after the user input), then the bundling state decision engine 126 can determine the uplink data flow request to be interactive. If, for example, audio and/or video playback by one or more of the application(s) 124 is in progress, then the bundling state decision engine 126 can determine the uplink data flow request to be interactive. If, for example, an uplink data flow request does not closely follow user input (e.g., >100 milliseconds after the user input) or the uplink data flow request does not include audio and/or video playback, then the bundling state decision engine 126 can determine the uplink data flow request to be non-interactive. Interactive characteristics can cause the bundling state decision engine 126 to associate the mobile device 102 with the "real-time for best latency device" bundling state. Non-interactive characteristics can cause the bundling state decision engine 126 to associate the mobile device 102 with the "bundle to conserve resources" bundling state.

In addition to QoS class, the network can look for a correlation between downlink page requests, and if found, preceding uplink requests from the mobile device 102. If the downlink page request follows an uplink request within a pre-defined time period, then the downlink flow is determined to be in response to an interactive user request. If there was no uplink request within the pre-defined time period, then the downlink page request is likely some non-interactive push application which can benefit from bundling without negatively impacting end user latency and experience.

It should be understood that some implementations of the operating environment 100 may include additional functionality or include less functionality than described above. Thus, the illustrated embodiment should be understood as being illustrative, and should not be construed as being limiting in any way.

Figure 2:
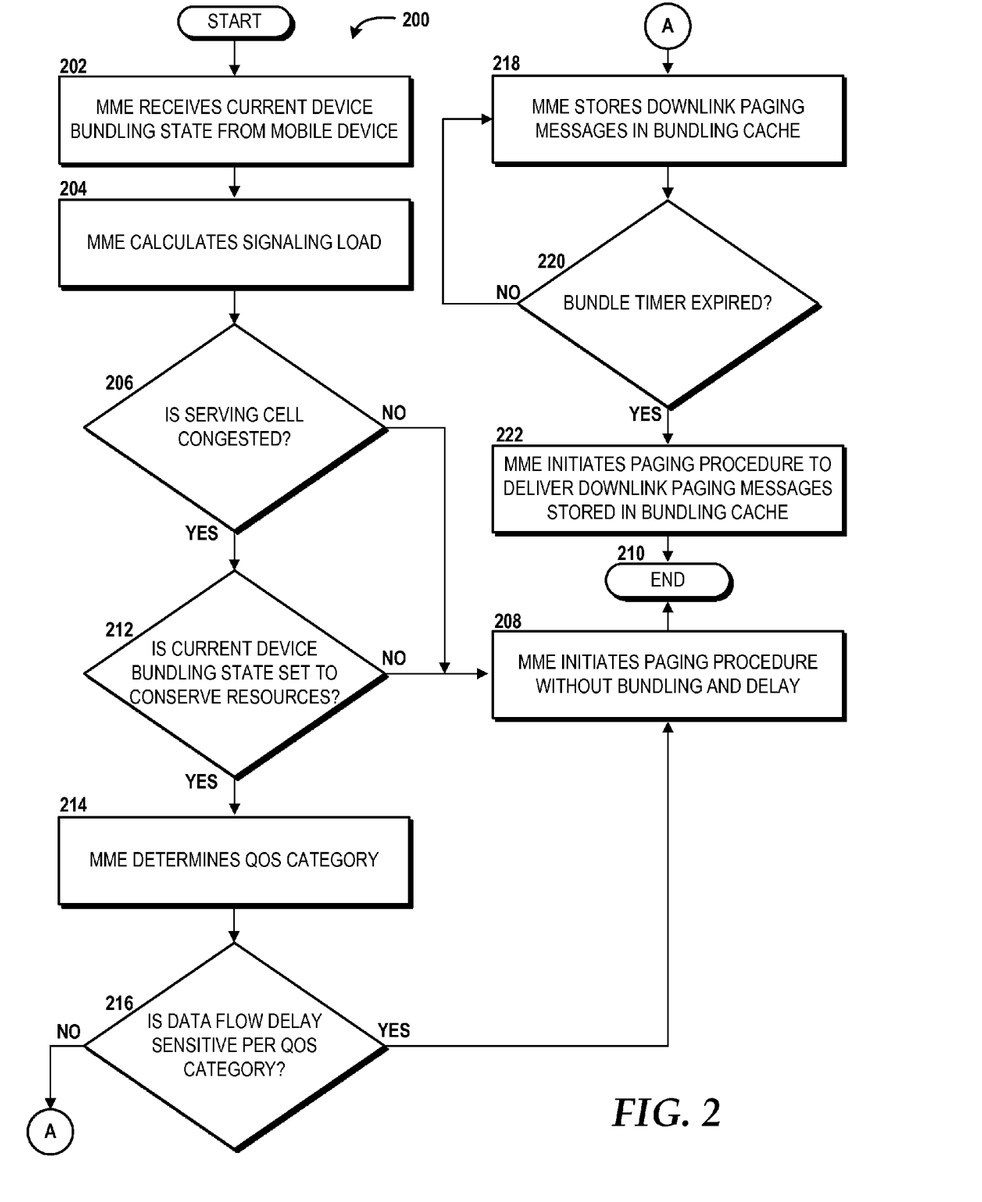
FIG. 2 is a flow diagram illustrating aspects of a method for adaptively and selectively bundling downlink paging messages, according to an illustrative embodiment.

Turning now to FIG. 2, a flow diagram illustrating aspects of a method 200 for adaptively and selectively bundling downlink paging messages will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 includes operations performed by the MME 108 via execution, by one or more processors, of the selective bundling decision engine 114. The method 200 is described with additional reference to FIG. 1. The method 200 begins and proceeds to operation 202, where the MME 108 receives the current device bundling state 118 from the mobile device 102. From operation 202, the method 200 proceeds to operation 204, where the MME 108 calculates a signaling load. In some embodiments, each eNodeB, such as the eNodeB 119, operating within the E-UTRAN 106 within a TA can report PDCCH, PUCCH, and/or paging channel occupancy back to the MME 108 according to a set interval. The MME 108 can utilize PDCCH, PUCCH, and/or paging channel occupancy to calculate or estimate signaling load at operation 204.

From operation 204, the method 200 proceeds to operation 206, where the MME 108 determines, based upon the signaling load calculated at operation 204, whether the serving cell of the mobile device 102 is congested. If the MME 108 determines that the serving cell of the mobile device 102 is not congested, the method 200 proceeds to operation 208, where the MME 108 initiates a paging procedure without bundling and delay. From operation 208, the method 200 proceeds to operation 210. The method 200 may end at operation 210.

If, however, the MME 108 determines, at operation 206, that the serving cell of the mobile device 102 is congested, the method 200 proceeds to operation 212, where the MME 108 determines if the current device bundling state 118 is set to conserve resources. If the MME 108 determines that the current device bundling state 118 is not set to conserve resources, the method 200 proceeds to operation 208, where the MME 108 initiates a paging procedure without bundling and delay. From operation 208, the method 200 proceeds to operation 210. The method 200 may end at operation 210.

If, however, the MME 108 determines, at operation 212, that the current device bundling state 118 is set to conserve resources, the method 200 proceeds to operation 214, where the MME 108 determines a QoS category for an associated data flow. From operation 214, the method 200 proceeds to operation 216, where the MME 108 determines if the QoS category determined at operation 214 is indicative of the data flow being delay sensitive. If the MME 108 determines, at operation 216, that the QoS category determined at operation 214 is indicative of the data flow being delay sensitive, the method 200 proceeds to operation 208, where the MME 108 initiates a paging procedure without bundling and delay. From operation 208, the method 200 proceeds to operation 210. The method 200 may end at operation 210.

If, however, the MME 108 determines, at operation 216, that the QoS category determined at operation 214 is not indicative of the data flow being delay sensitive, the method 200 proceeds to operation 218, where the MME 108 stores one or more downlink paging messages in the downlink paging message bundling cache 116. Also, the first time operation 218 is executed by the MME 108, the MME 108 can initiate a bundle timer for the downlink paging message bundling cache 116.

From operation 218, the method 200 proceeds to operation 220, where the MME 108 determines whether the bundle timer for the downlink paging message bundling cache 116 has expired. If the MME 108 determines that the bundle timer has not expired, the method 200 proceeds back to operation 218, where the MME 108 continues to store one or more downlink paging messages in the downlink paging message bundling cache 116. If, however, the MME 108 determines that the bundle timer has expired, the method 200 proceeds to operation 222. At operation 222, the MME 108 initiates a paging procedure to deliver the downlink paging message(s) stored in the downlink paging message bundling cache 116 to the mobile device 102. Also at operation 222, the MME 108 can reset the bundle timer. From operation 222, the method 200 proceeds to operation 210, where the method 200 may end.

Figure 3:
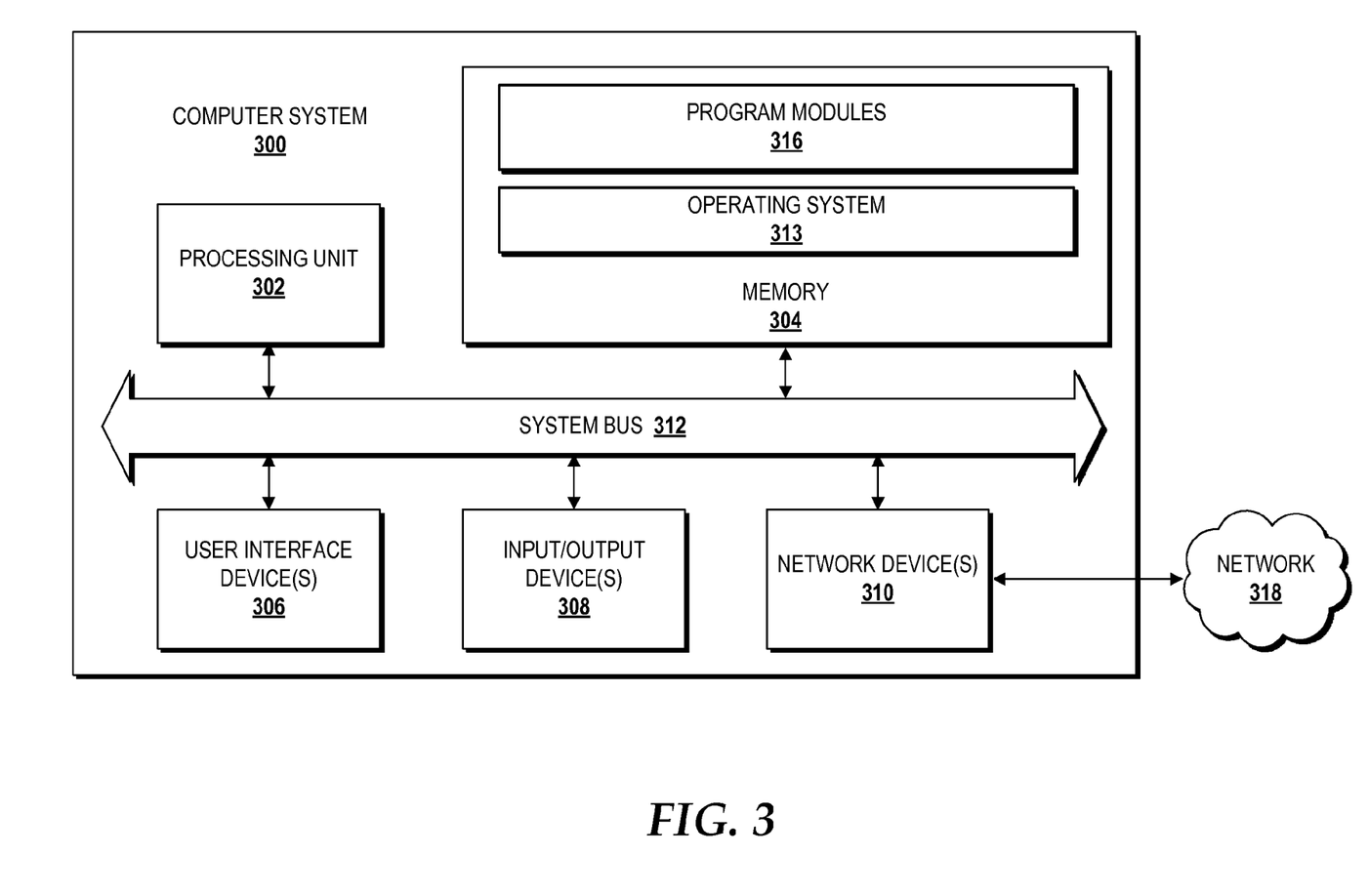
FIG. 3 is a block diagram illustrating an example computer system capable of implementing aspects of the embodiments presented herein.

FIG. 3 is a block diagram illustrating a computer system 300 configured to provide the functionality in accordance with various embodiments of the concepts and technologies disclosed herein. In some implementations, the mobile device 102, MME 108, one or more of the other EPC functions 110, and/or the eNodeB 119 can utilize an architecture that is the same as or similar to the architecture of the computer system 300. It should be understood, however, that modification to the architecture may be made to facilitate certain interactions among elements described herein.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 304 communicates with the processing unit 302 via the system bus 312. In some embodiments, the memory 304 is operatively connected to a memory controller (not shown) that enables communication with the processing unit 302 via the system bus 312. The memory 304 includes an operating system 313 and one or more program modules 316. The operating system 313 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 316 may include various software and/or program modules to perform the various operations described herein. The program modules 316 can include the application(s) 124 and the bundling state decision engine 126 in embodiments that the mobile device 102 is configured like the computer system 300. The program modules 316 can include the selective bundling decision engine 114 in embodiments that the MME 108 is configured like the computer system 300. The program modules 316 and/or other programs can be embodied in computer-readable media containing instructions that, when executed by the processing unit 302, perform one or more of the methods 200, or at least a portion thereof, described in detail above with respect to FIG. 2. According to embodiments, the program modules 316 may be embodied in hardware, software, firmware, or any combination thereof. Although not shown in FIG. 3, it should be understood that the memory 304, in embodiments that the mobile device 102 is configured like the computer system 300, also can be configured to store the device bundling states 128-128N, and/or other data. Although not shown in FIG. 3, it should be understood that the memory 304, in embodiments that the MME 108 is configured like the computer system 300, also can be configured to store the downlink paging message bundling cache 116, and/or other data.

By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium" and variations thereof does not include waves or signals per se and/or communication media.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via a network 318, which can include, for example, the EPC 104 and the E-UTRAN 106. Examples of the network devices 310 include, but are not limited to, a modem, a radio frequency ("RF") or infrared ("IR") transceiver, a telephonic interface, a bridge, a router, or a network card. The network 318 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 318 may be a wired network such as, but not limited to, a wide area network ("WAN"), a wired LAN such as provided via Ethernet, a wired personal area network ("PAN"), or a wired metropolitan area network ("MAN").

Figure 4:
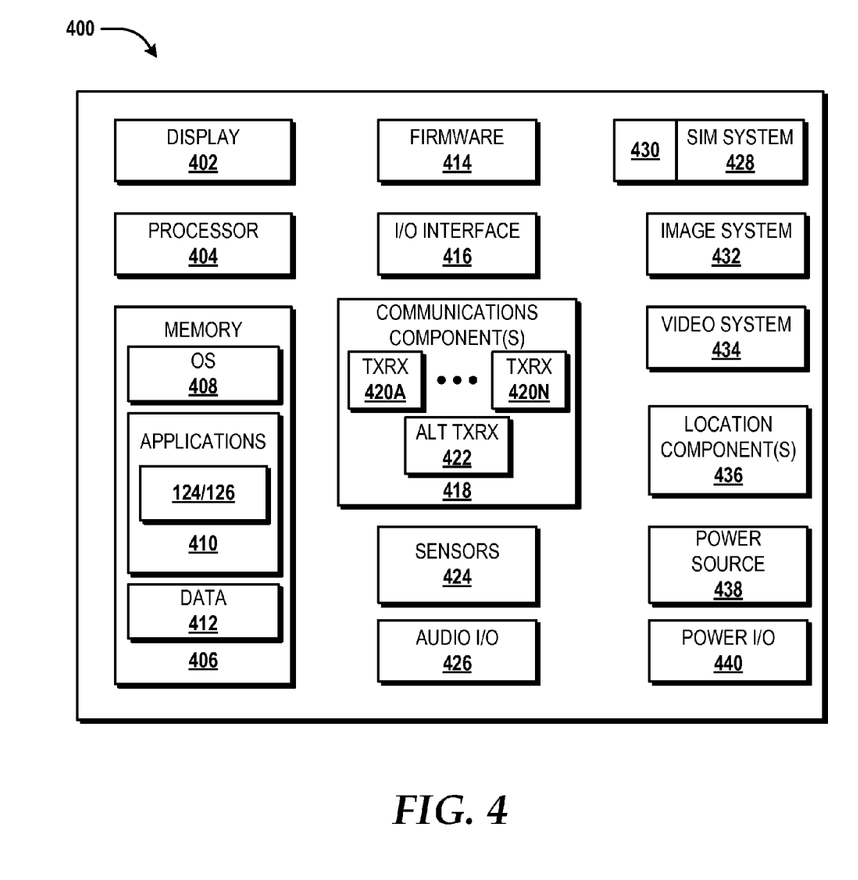
FIG. 4 is a block diagram illustrating an example mobile device capable of implementing aspects of the embodiments disclosed herein.

Turning now to FIG. 4, an illustrative mobile device 400 and components thereof will be described. In some embodiments, the mobile device 102 described above with reference to FIG. 1 can be configured as and/or can have an architecture similar or identical to the mobile device 400 described herein in FIG. 4. It should be understood, however, that the mobile device 102 may or may not include the functionality described herein with reference to FIG. 4. While connections are not shown between the various components illustrated in FIG. 4, it should be understood that some, none, or all of the components illustrated in FIG. 4 can be configured to interact with one other to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 400 also can include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408 (e.g., the operating system 122), one or more applications 410 (e.g., the application(s) 124 and the bundling state decision engine 126), other computer-executable instructions stored in a memory 406, or the like. In some embodiments, the applications 410 also can include a UI application (not illustrated in FIG. 4).

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering content, viewing account information, answering/initiating calls, entering/deleting data, entering and setting user IDs and passwords for device access, configuring settings, manipulating address book content and/or settings, multimode interaction, interacting with other applications 410, and otherwise facilitating user interaction with the operating system 408, the applications 410, and/or other types or instances of data 412 that can be stored at the mobile device 400. The data 412 can include, for example, the device bundling states 128-128N, the current device bundling state 118, the downlink paging bundle 120, and/or other data, if desired.

According to various embodiments, the applications 410 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, user information, organization information, presence status information, user IDs, passwords, and application initiation (start-up) requests. In some embodiments, the I/O interface 416 can include a hardwire connection such as USB port, a mini-USB port, a micro-USB port, an audio jack, a PS2 port, an IEEE 1394 ("FIREWIRE") port, a serial port, a parallel port, an Ethernet (RJ44) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks described above herein. In some embodiments, other networks include networks that utilize noncellular wireless technologies such as WI-FI or WIMAX. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments one or more of the transceivers of the communications component 418 may be configured to communicate using GSM, CDMA, CDMAONE, CDMA2000, LTE, and various other 2G, 2.4G, 3G, 4G, and greater generation technology standards. Moreover, the communications component 418 may facilitate communications over various channel access methods (which may or may not be used by the aforementioned standards) including, but not limited to, TDMA, FDMA, W-CDMA, OFDM, SDMA, and the like.

In addition, the communications component 418 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 418 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, IRDA, NFC, other RF technologies, combinations thereof, and the like.

In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, orientation sensors, noise sensors, proximity sensors, or the like. As such, it should be understood that the sensors 424 can include, but are not limited to, accelerometers, magnetometers, gyroscopes, infrared sensors, noise sensors, microphones, combinations thereof, or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another mobile device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from GPS devices, A-GPS devices, WI-FI/WIMAX and/or cellular network triangulation data, combinations thereof, and the like. The location component 436 also can be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 438. The power source 438 can include one or more batteries, power supplies, power cells, and/or other power subsystems including alternating current ("AC") and/or direct current ("DC") power devices. The power source 438 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

Figure 5:
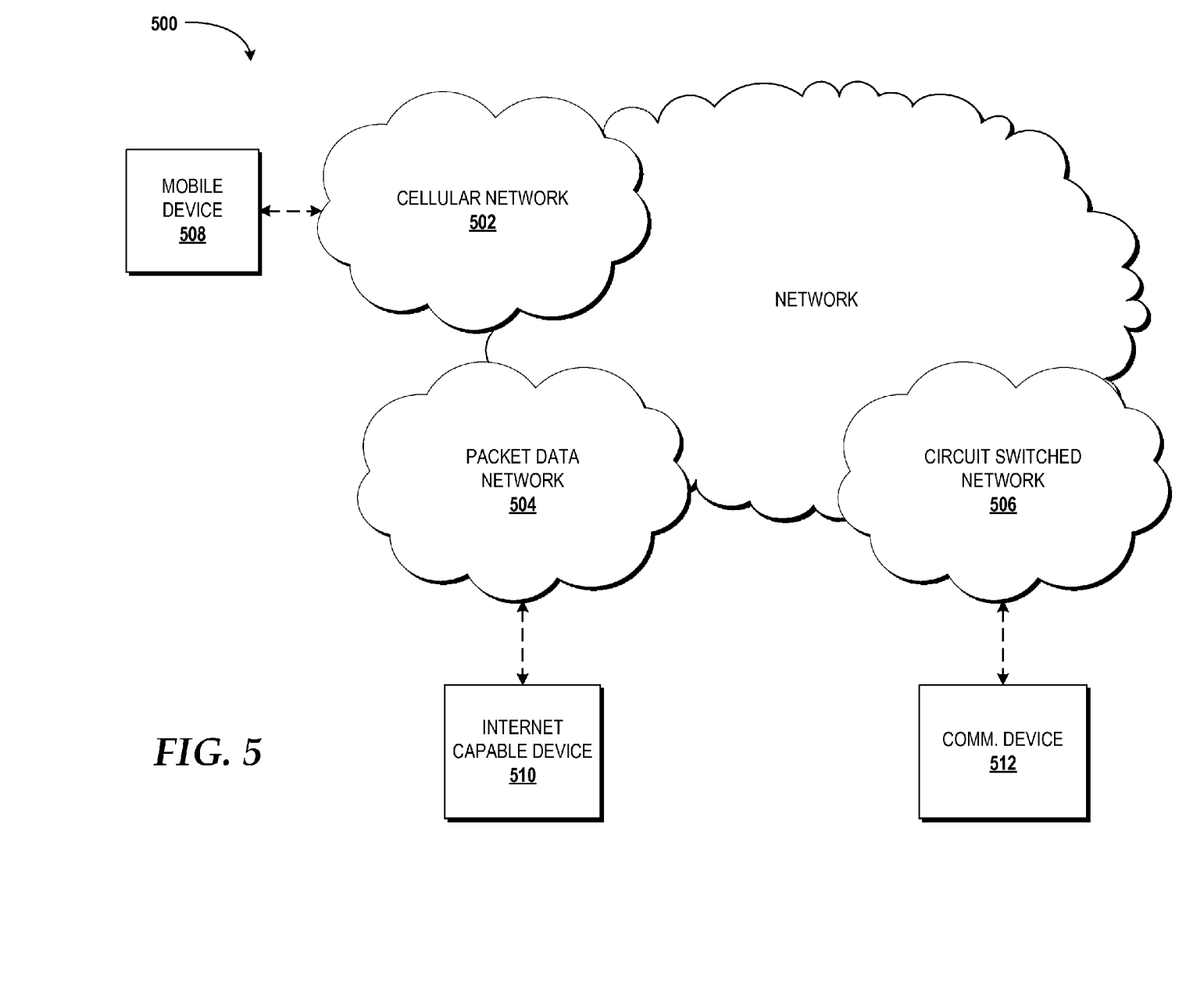
FIG. 5 schematically illustrates a network, according to an illustrative embodiment.

Turning now to FIG. 5, additional details of a network 500 are illustrated, according to an illustrative embodiment. The network 500 includes a cellular network 502, a packet data network 504, for example, the Internet, and a circuit switched network 506, for example, a publicly switched telephone network ("PSTN"). The cellular network 502 includes various components such as, but not limited to, RANs (e.g., the E-UTRAN 106), BTSs, NodeBs or eNodeBs (e.g., the eNodeB 119), base station controllers ("BSCs"), radio network controllers ("RNCs"), mobile switching centers ("MSCs"), MMEs (e.g., the MME 108), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), the EPC 104, the other EPC functions 110, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, the mobile device 102, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards such as LTE, or the like, as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, the mobile device 102, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, the mobile device 102, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 500 is used to refer broadly to any combination of the networks 502, 504, 506. It should be appreciated that substantially all of the functionality described with reference to the network 500 can be performed by the cellular network 502, the packet data network 504, and/or the circuit switched network 506, alone or in combination with other networks, network elements, and the like.

Based on the foregoing, it should be appreciated that concepts and technologies directed to adaptive and selective bundling of downlink paging messages have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   determining, by a mobility management entity comprising a processor, whether to delay a paging procedure to deliver a downlink paging message to a mobile device served by the mobility management entity;
   when the mobility management entity determines that the paging procedure to deliver the downlink paging message to the mobile device should be delayed, storing the downlink paging message in a downlink paging message bundling cache;
   receiving, by the mobility management entity, a current device bundling state from the mobile device;
   determining, by the mobility management entity, whether the current device bundling state is set to conserve resources;
   when the mobility management entity determines that the current device bundling state is not set to conserve resources, determining, by the mobility management entity, that the paging procedure to deliver the downlink paging message to the mobile device should not be delayed and, in response, initiating the paging procedure without delay and without storing the downlink paging message in the downlink paging message bundling cache; and
   when the mobility management entity determines that the current device bundling state is set to conserve resources, determining, by the mobility management entity, that the paging procedure to deliver the downlink paging message to the mobile device should be delayed.

2. The method of claim 1, wherein determining whether to delay the paging procedure to deliver the downlink paging message to the mobile device served by the mobility management entity comprises:
   determining, by the mobility management entity, whether a data flow associated with the mobile device is delay sensitive; and
   when the mobility management entity determines that the data flow associated with the mobile device is delay sensitive, determining, by the mobility management entity, that the paging procedure to deliver the downlink paging message to the mobile device should not be delayed and, in response, initiating the paging procedure without delay and without storing the downlink paging message in the downlink paging message bundling cache.

3. The method of claim 2, wherein when the mobility management entity determines that the data flow associated with the mobile device is not delay sensitive, determining, by the mobility management entity, that the paging procedure to deliver the downlink paging message to the mobile device should be delayed.

4. The method of claim 3, further comprising determining, by the mobility management entity, a quality of service category for the data flow associated with the mobile device; and wherein determining, by the mobility management entity, whether the data flow associated with the mobile device is delay sensitive comprises determining, by the mobility management entity, whether the data flow associated with the mobile device is delay sensitive based upon the quality of service category.

5. The method of claim 4, further comprising:
   initiating, by the mobility management entity, a bundle timer for the downlink paging message bundling cache;
   determining, by the mobility management entity, whether the bundle timer has expired;
   when the mobility management entity determines that the bundle timer has expired, determining, by the mobility management entity, that the paging procedure to deliver the downlink paging message to the mobile device should not be further delayed and, in response, initiating the paging procedure to deliver the downlink paging message stored in the downlink paging message bundling cache to the mobile device; and
   when the mobility management entity determines that the bundle timer has not expired, determining, by the mobility management entity, that the paging procedure to deliver the downlink paging message to the mobile device should be further delayed and, in response, allowing storage of a further downlink paging message in the downlink paging message bundling cache.

6. The method of claim 5, further comprising:
   calculating, by the mobility management entity, a signaling load experienced by a cell that is serving the mobile device;
   determining, by the mobility management entity, whether the cell that is serving the mobile device is congested based upon the signaling load;
   when the mobility management entity determines that the cell that is serving the mobile device is not congested, determining, by the mobility management entity, that the paging procedure to deliver the downlink paging message to the mobile device should not be delayed and, in response, initiating the paging procedure without delay and without storing the downlink paging message in the downlink paging message bundling cache; and
   when the mobility management entity determines that the cell that is serving the mobile device is congested, determining, by the mobility management entity, that the paging procedure to deliver the downlink paging message to the mobile device should be delayed.

7. A mobility management entity comprising:
   a processor; and
   a memory comprising computer-executable instructions that, when executed by the processor, cause the mobility management entity to perform operations comprising:
      determining, by a selective bundling decision engine, whether to delay a paging procedure to deliver a downlink paging message to a mobile device served by the mobility management entity,
      when the mobility management entity determines that the paging procedure to deliver the downlink paging message to the mobile device should be delayed, storing the downlink paging message in a downlink paging message bundling cache,
      receiving a current device bundling state from the mobile device,
      determining whether the current device bundling state is set to conserve resources,
      when the mobility management entity determines that the current device bundling state is not set to conserve resources, determining that the paging procedure to deliver the downlink paging message to the mobile device should not be delayed and, in response, initiating the paging procedure without delay and without storing the downlink paging message in the downlink paging message bundling cache, and
      when the mobility management entity determines that the current device bundling state is set to conserve resources, determining that the paging procedure to deliver the downlink paging message to the mobile device should be delayed.

8. The mobility management entity of claim 7, wherein determining whether to delay the paging procedure to deliver the downlink paging message to the mobile device served by the mobility management entity comprises:
   determining whether a data flow associated with the mobile device is delay sensitive;
   when the mobility management entity determines that the data flow associated with the mobile device is delay sensitive, determining that the paging procedure to deliver the downlink paging message to the mobile device should not be delayed and, in response, initiating the paging procedure without delay and without storing the downlink paging message in the downlink paging message bundling cache; and
   when the mobility management entity determines that the data flow associated with the mobile device is not delay sensitive, determining that the paging procedure to deliver the downlink paging message to the mobile device should be delayed.

9. The mobility management entity of claim 8, wherein the operations further comprise determining a quality of service category for the data flow associated with the mobile device; and wherein determining whether the data flow associated with the mobile device is delay sensitive comprises determining whether the data flow associated with the mobile device is delay sensitive based upon the quality of service category.

10. The mobility management entity of claim 9, wherein the operations further comprise:
    initiating a bundle timer for the downlink paging message bundling cache;
    determining whether the bundle timer has expired;
    when the mobility management entity determines that the bundle timer has expired, then determining that the paging procedure to deliver the downlink paging message to the mobile device should not be further delayed and, in response, initiating the paging procedure to deliver the downlink paging message stored in the downlink paging message bundling cache to the mobile device; and
    when the mobility management entity determines that the bundle timer has not expired, determining that the paging procedure to deliver the downlink paging message to the mobile device should be further delayed and, in response, allowing storage of a further downlink paging message in the downlink paging message bundling cache.

11. The mobility management entity of claim 10, wherein the operations further comprise:
    calculating a signaling load experienced by a cell that is serving the mobile device;
    determining whether the cell that is serving the mobile device is congested based upon the signaling load;
    when the mobility management entity determines that the cell that is serving the mobile device is not congested, determining that the paging procedure to deliver the downlink paging message to the mobile device should not be delayed and, in response, initiating the paging procedure without delay and without storing the downlink paging message in the downlink paging message bundling cache; and
    when the mobility management entity determines that the cell that is serving the mobile device is congested, then determining that the paging procedure to deliver the downlink paging message to the mobile device should be delayed.

12. A computer-readable storage medium comprising computer-executable instructions that, when executed by a processor of a mobility management entity, cause the mobility management entity to perform operations comprising:
    determining, by a selective bundling decision engine, whether to delay a paging procedure to deliver a downlink paging message to a mobile device served by the mobility management entity;
    when the mobility management entity determines that the paging procedure to deliver the downlink paging message to the mobile device should be delayed, storing the downlink paging message in a downlink paging message bundling cache;
    receiving a current device bundling state from the mobile device;
    determining whether the current device bundling state is set to conserve resources;
    when the mobility management entity determines that the current device bundling state is not set to conserve resources, determining that the paging procedure to deliver the downlink paging message to the mobile device should not be delayed and, in response, initiating the paging procedure without delay and without storing the downlink paging message in the downlink paging message bundling cache; and
    when the mobility management entity determines that the current device bundling state is set to conserve resources, determining that the paging procedure to deliver the downlink paging message to the mobile device should be delayed.

13. The computer-readable storage medium of claim 12, wherein determining whether to delay the paging procedure to deliver the downlink paging message to the mobile device served by the mobility management entity comprises:
    determining whether a data flow associated with the mobile device is delay sensitive; and
    when the mobility management entity determines that the data flow associated with the mobile device is delay sensitive, determining that the paging procedure to deliver the downlink paging message to the mobile device should not be delayed and, in response, initiating the paging procedure without delay and without storing the downlink paging message in the downlink paging message bundling cache.

14. The computer-readable storage medium of claim 13, wherein when the mobility management entity determines that the data flow associated with the mobile device is not delay sensitive, determining that the paging procedure to deliver the downlink paging message to the mobile device should be delayed.

15. The computer-readable storage medium of claim 14, wherein the operations further comprise determining a quality of service category for the data flow associated with the mobile device; and wherein determining whether the data flow associated with the mobile device is delay sensitive comprises determining whether the data flow associated with the mobile device is delay sensitive based upon the quality of service category.

16. The computer-readable storage medium of claim 15, wherein the operations further comprise:
    initiating a bundle timer for the downlink paging message bundling cache;
    determining whether the bundle timer has expired;

when the mobility management entity determines that the bundle timer has expired, determining that the paging procedure to deliver the downlink paging message to the mobile device should not be further delayed and, in response, initiating the paging procedure to deliver the downlink paging message stored in the downlink paging message bundling cache to the mobile device; and when the mobility management entity determines that the bundle timer has not expired, determining that the paging procedure to deliver the downlink paging message to the mobile device should be further delayed and, in response, allowing storage of a further downlink paging message in the downlink paging message bundling cache.

17. The computer-readable storage medium of claim 16, wherein the operations further comprise:

calculating a signaling load experienced by a cell that is serving the mobile device;

determining whether the cell that is serving the mobile device is congested based upon the signaling load;

when the mobility management entity determines that the cell that is serving the mobile device is not congested, determining that the paging procedure to deliver the downlink paging message to the mobile device should not be delayed and, in response, initiating the paging procedure without delay and without storing the downlink paging message in the downlink paging message bundling cache; and when the mobility management entity determines that the cell that is serving the mobile device is congested, determining that the paging procedure to deliver the downlink paging message to the mobile device should be delayed.

* * * * *